(12) United States Patent
Johnson

(10) Patent No.: US 7,640,785 B2
(45) Date of Patent: Jan. 5, 2010

(54) DEVICE FOR TEST RUNNING POWER NUT RUNNERS

(75) Inventor: Anders Rolf Mikael Johnson, Trångsund (SE)

(73) Assignee: Atlas Copco Tools AB, Nacka (SE)

( * ) Notice: Subject to any disclaimer, the term of this patent is extended or adjusted under 35 U.S.C. 154(b) by 531 days.

(21) Appl. No.: 10/582,902

(22) PCT Filed: Dec. 16, 2004

(86) PCT No.: PCT/SE2004/001896

§ 371 (c)(1),
(2), (4) Date: Jan. 8, 2007

(87) PCT Pub. No.: WO2005/059496

PCT Pub. Date: Jun. 30, 2005

(65) Prior Publication Data

US 2007/0107489 A1  May 17, 2007

(30) Foreign Application Priority Data

Dec. 19, 2003  (SE) .................................... 0303428

(51) Int. Cl.
*G01L 25/00* (2006.01)
(52) U.S. Cl. ...................................................... 73/1.12
(58) Field of Classification Search ................ 73/1.09, 73/1.11, 1.12, 865.9
See application file for complete search history.

(56) References Cited

U.S. PATENT DOCUMENTS 2,503,649 A  4/1950  Zimmerman 3,999,426 A * 12/1976  Sonderegger ............ 73/862.08
6,718,831 B2 *  4/2004  Chiapuzzi et al. ............. 73/761

FOREIGN PATENT DOCUMENTS

CH  603311 A5  8/1978
DE  19901449 A1  7/1999

OTHER PUBLICATIONS

Patent Abstract of Japan; vol. 010, No. 308, Oct. 21, 1986 & JP 61122540A (Nippon Pneumatic Kiogyo KK) ; Jun. 10, 1986.

* cited by examiner

*Primary Examiner*—Robert R Raevis
(74) *Attorney, Agent, or Firm*—Frishauf, Holtz, Goodman & Chick, P.C.

(57) ABSTRACT

A device for test running of power nut runners comprises a main body (10;50) with a nut (11;54), a screw (12;52) with a nut runner engaging head (13;55), a clamping element (14; 56) co-operating with the screw (12;52), and spring unit (17; 59) to be clamped between the clamping element (14;56) and the main body (10;50) to generate a torque resistance on the screw (12;52), wherein a one-way clutch (24;64) is provided between the nut (11;54) and the main body (10;50) to prevent rotation of the nut (11;54) at rotation of the screw (12;52) in the tightening direction and to permit rotation of the nut (11) when rotating the screw (12;52) in the loosening direction, a friction clutch (30;72,73) between the nut (11;54) and the main body (10;50) is arranged to prevent rotation of the nut (11;54) during loosening of the screw (12;52), and a lock element (34;70) secured to the screw (12;52) is arranged to rotationally lock the screw (12;52) to the nut (11;54) at continued rotation of the screw (12;52) in the loosening direction.

16 Claims, 2 Drawing Sheets

DEVICE FOR TEST RUNNING POWER NUT RUNNERS

This application is a U.S. National Phase Application under 35 USC 371 of International Application PCT/SE2004/001896 filed Dec. 16, 2004.

The invention relates to a device simulating a screw joint and intended for repeated test running power nut runners and comprises a screw, a main body with a nut, and a spring unit to be compressed when rotating the screw in the tightening the tightening direction.

Power nut runner test devices of the above type have been used for a long time but have an inherent weakness, namely that when running a number of test tightening operations of the screw will end up in the very same angular position each time the power nut runner reaches the set final torque level. This is a drawback, because the gear transmission of the nut runner will also be in the very same position each time the final torque level is reached. Due to the fact that the transmission gears, angle gears in particular, always involve some irregularities and that, accordingly, the torque output from the nut runner is not perfectly even over a full output shaft revolution, and the actually obtained torque magnitude varies with the angular position of the output shaft at the attainment of the set final torque level. This means in turn that when setting the final torque on the nut runner the torque level might be too high or too low.

The main object of the invention is to provide a nut runner test device where the angular end position of the screw and, hence, the angular position of the output shaft of the nut runner will vary randomly from one test run to another, thereby making it possible to determine a mean value of the obtained output torque which will be more accurate.

Further objects and advantages of the invention will appear from the following specification.

Preferred embodiments of the invention are described below in detail with reference to the accompanying drawings.

In the drawings

Figure 1:
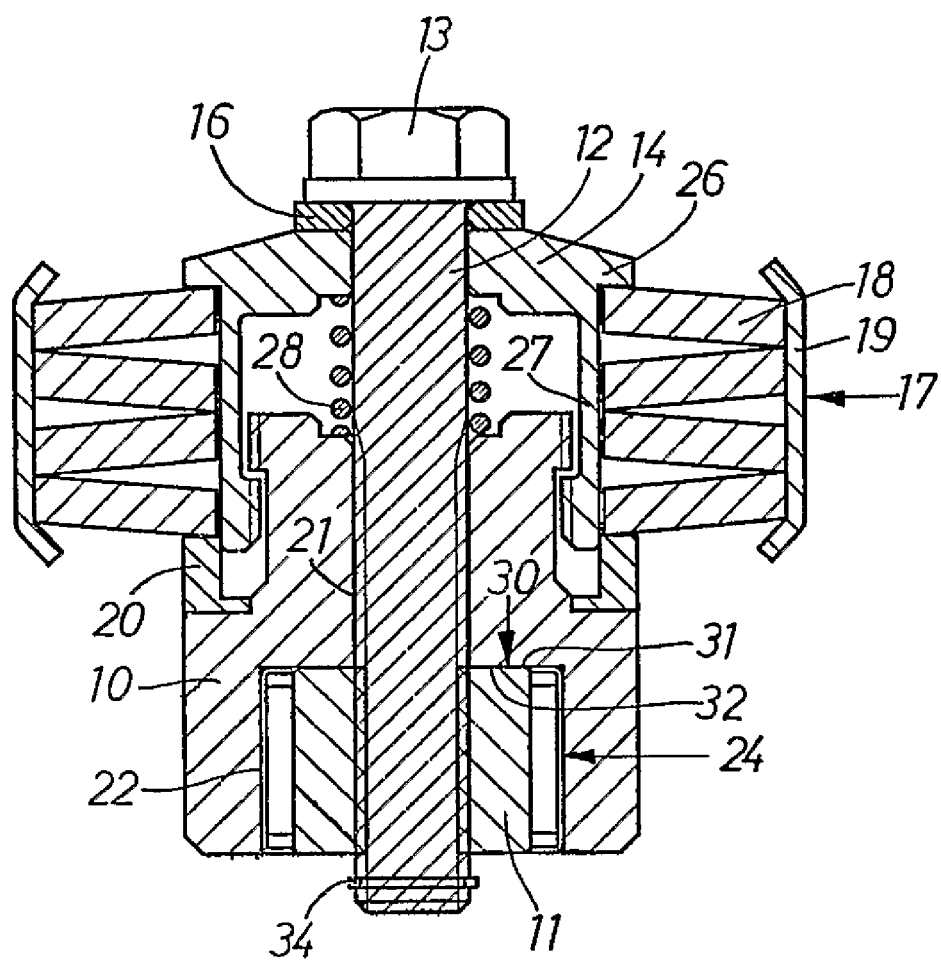
FIG. 1 shows a longitudinal section through a nut runner test device according to one embodiment of the invention.

The test device shown in FIG. 1 comprises a main body 10 with a nut 11, a screw 12 with a nut runner engaging hexagonal head 13, a clamping element 14 engaged by the screw head 13 via a washer 16, and a spring unit 17. The spring unit 17 comprises a number of stacked Belleville-type spring washers 18 which are kept together by a sleeve shaped cage 19 and supported on the main body 10 via number of axially directed dogs 20.

The main body 10 has a central bore 21 for receiving the screw 12 and a co-axial socket portion 22 in which the nut 11 is received. In the socket portion 22, between the nut and the main body 10, there is provided a roller-type one-way clutch 24. This one-way clutch 24 is arranged to lock the nut 11 against rotation in a step-less manner when the screw 12 is rotated in its tightening direction and permit rotation of the nut 11 when the screw 12 is rotated in its loosening direction.

The clamping element 14 is formed with an annular shoulder 26 for engaging the spring unit 17 and having a tubular extension 27 which forms a radial support for the spring unit 17. Between the clamping element 14 and the main body 10 and in parallel with the spring unit 17 there is inserted an auxiliary spring 28.

A friction brake 30 is arranged between the nut 11 and the main body 10 and comprises an axially facing contact surface 31 on the main body 10 and an oppositely facing contact surface 32 on the nut 11. These two contact surfaces 31,32 are biassed into engagement with each other by the auxiliary spring 28 and also by the spring unit 17, as long as the latter is compressed by the screw 12. The screw 12 carries a lock element 34 in the form of a lock ring the purpose of which is to engage the nut 11 and lock together the screw 12 and the nut 11 in a position where the compression of the spring unit 17 has ceased.

The operation order of the device is described as follows. A nut runner test running process is started in that the screw 12 is rotated in its tightening direction by means of the nut runner applied on the head 13. By its co-operation with the nut 11 the screw 12 starts to move downwards in the drawing figure, whereby the head 13 gets into contact with the clamping element 14 via the washer 16. Due to the locking action of the one-way clutch 24 the nut 11 is kept stationary relative to the main body 10. At continued rotation of the screw 12 in the tightening direction the clamping element 14 starts compressing the spring unit 17, whereby an increasing reaction torque in the screw 12 is generated. The tightening process is continued until a pre-set final torque level is reached. The nut runner is shut off, and the torque magnitude actually obtained is detected by a non-illustrated torque sensor.

The test running cycle is completed by the screw 12 being rotated in its opposite direction to relieve the clamping load on the spring unit 17. However, as long as the spring unit 17 is compressed it accomplishes a contact force between the contact surfaces 31,23 of the friction brake 30, which means that the nut 11 is frictionally locked to the main body 10 during the loosening rotation of the screw 12. In other words, it is of no significance that the one-way clutch 24 permits rotation of the nut 11 in the loosening direction of the screw 12, because the friction brake 30 still locks the nut 11 relative to the main body 10.

At continued rotation of the screw 12 in the loosening direction the spring unit 17 becomes unloaded and ceases to exert a contact pressure on the friction brake 30. Due to the action of the auxiliary spring 28, however, there is still a contact pressure acting on the friction brake 24 such that the screw 12 can be rotated some more in its loosening direction without the nut 11 starts rotating. When at last the screw 12 reaches a position where the lock ring 34 engages the nut 11 the screw 12 becomes rotationally locked relative to the nut 11 with a force that overrules the friction force of the brake 24. This means that the nut 11 will start rotating relative to the main body 10 together with the screw 12 until the nut runner is shut off.

In this position the head 13 has separated from the clamping element 14 and a new test run may be started. When starting a new test running process, the screw 12 is rotated in its tightening direction, and the one-way clutch 24 will immediately lock the nut 11 relative to the main body 10 and enabling tightening of the screw 12 with compression of the spring unit 17 as a consequence. Due to the fact that the nut 11 was locked to the screw 12 during the final rotation of the screw 12 in the loosening direction the nut 11 was brought to rotate a certain angle relative to the main body 10. When starting the new tightening operation the one-way clutch will re-engage a random angular position relative to the main body 10, which means that the final position of the screw 12 when reaching the final torque level will not be the same as the final position in the foregoing tightening operation. This means that the final torque level is reached with the rotating parts of the nut runner transmission in different positions, and the actually obtained torque magnitude will most probably be somewhat different from the magnitude of the previous tightening process. After a number of test runs it is possible to determine the deviation range of the obtained output torque, and a mean value of all test results may be calculated.

Figure 2:
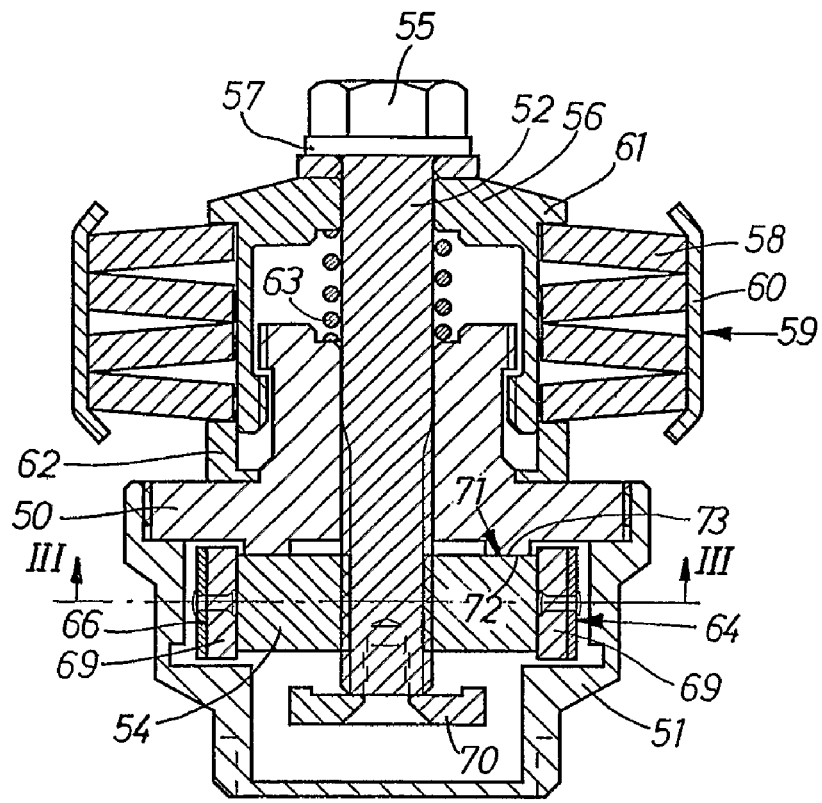
FIG. 2 shows a longitudinal section through a nut runner test device according to another embodiment of the invention.
Figure 3:
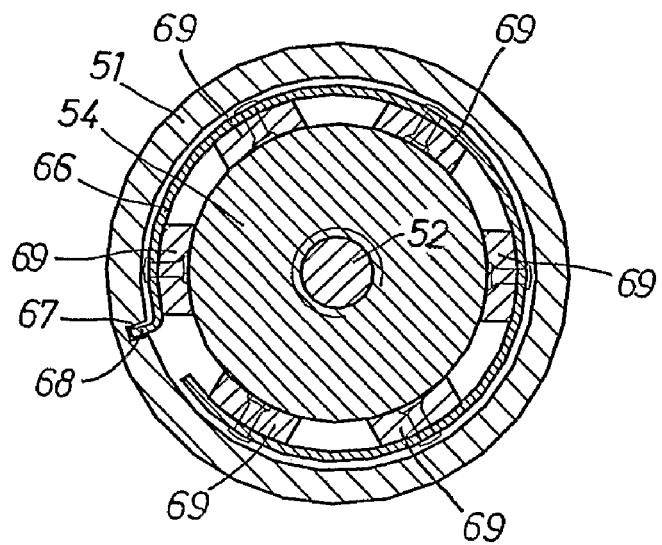
FIG. 3 shows a cross section along line III-III in FIG. 2.

The test device illustrate in FIGS. 2 and 3 is quite similar to the one described above and comprises main body 50 with a cup-shaped section 51 fixed to its lower end, a screw 52 extending through a central bore 53 in the main body 50 and co-operating with a nut 54. The screw 52 has a hexagonal head 55 for engaging a clamping element 56 via a steel washer 57. A number of stacked Belleville-type spring washers 58 form a spring unit 59 which is inserted between a shoulder 61 on the clamping element 56 and a support ring 62 on the main body 10. A sleeve shaped cage 60 maintains the spring washers together. Between the clamping element 56 and the main body 50 there is also provided an auxiliary spring 63.

In the cup-shaped end section 51 of the main body 50 there is arranged a step-less one-way clutch 64 comprising a circular leaf spring element 66 with a bent end portion 67 received in a slot 68 in the end section 51. See FIG. 3. The leaf spring element 66 is provided with a number of friction shoes 69 for co-operation with the outer surface of the nut 54. This clutch 64 is arranged to lock the nut 54 against rotation when rotating the screw 52 in the tightening direction, but permit rotation of the nut 54 when rotating the screw 52 in the loosening direction. The locking action of the clutch 64 is accomplished by a self tightening action of the leaf spring element 66 when the nut 54 is rotated, or is attempted to be rotated, in the tightening direction of the screw 52, i.e. clock-wise in FIG. 3. The spring element 66 is wrapped tight onto the nut 54 and generates a locking action via the friction shoes 69. When rotating the nut 54 in the opposite direction the spring element 66 opens up and unlocks the nut 54.

At its lower end, the screw 52 is provided with a stop member 70 which will co-operate with the nut 54 and limits the axial movement of the screw 52 in the loosening direction.

As in the above described embodiment a friction brake 71 including contact surfaces 72,73 is provided on the nut 54 and the main body 50 to prevent rotation of the nut 54 until the stop member 70 positively locks the nut 54 to the screw 52. During the first part of the screw rotation in the loosening direction, the axial load of the spring unit 59 generates a friction force locking the nut 54 to the main body 50. When the spring unit 59 is completely unloaded, the auxiliary spring 63 generates a friction force strong enough to prevent the nut 54 from rotating, but as soon as the stop member 70 engages the nut 54 the latter is forced to rotate in the loosening direction of the screw 52.

It is to be noted that the embodiments of the invention are not limited to the shown and described examples but can be freely varied within the scope of the claims.

The invention claimed is:

1. A device for test running of power nut runners, comprising:
   a main body with a nut,
   a screw engaging the nut and having a nut runner engaging head,
   a clamping element engaged by the screw head, and
   a spring unit disposed between the clamping element and the main body and arranged to be compressed at rotation of the screw in its tightening direction,
   a one-way clutch between the nut and the main body for locking the nut against rotation relative to the main body at rotation of the screw in its tightening direction and permitting rotation of the nut relative to the main body at rotation of the screw in its loosening direction,
   a friction brake between the nut and the main body for preventing rotation of-the nut relative to the main body at rotation of the screw in its loosening direction, and
   a lock element secured to the screw and arranged to positively engage the nut in a position of the screw where the spring unit is no longer compressed, thereby accomplishing a nut rotating force overruling said friction brake.

2. The device according to claim 1, wherein said one-way clutch comprises a step-less type clutch.

3. The device according to claim 2, wherein said friction brake comprises an axially facing contact surface on the main body and an oppositely facing contact surface on the nut.

4. The device according to claim 3, wherein the main body is formed with a co-axial socket and the nut and said one-way clutch are located in said socket portion.

5. The device according to claim 2, wherein the main body is formed with a co-axial socket and the nut and said one-way clutch are located in said socket portion.

6. The device according to claim 2, wherein an auxiliary spring is provided in parallel with the spring unit to exert an engaging force on said friction brake.

7. The device according to claim 6, wherein said friction brake comprises an axially facing contact surface on the main body and an oppositely facing contact surface on the nut.

8. The device according to claim 7, wherein the main body is formed with a co-axial socket and the nut and said one-way clutch are located in said socket portion.

9. The device according to claim 6, wherein the main body is formed with a co-axial socket and the nut and said one-way clutch are located in said socket portion.

10. The device according to claim 1, wherein an auxiliary spring is provided in parallel with the spring unit to exert an engaging force on said friction brake.

11. The device according to claim 10, wherein said friction brake comprises an axially facing contact surface on the main body and an oppositely facing contact surface on the nut.

12. The device according to claim 11, wherein the main body is formed with a co-axial socket and the nut and said one-way clutch are located in said socket portion.

13. The device according to claim 10, wherein the main body is formed with a co-axial socket and the nut and said one-way clutch are located in said socket portion.

14. The device according to claim 1, wherein said friction brake comprises an axially facing contact surface on the main body and an oppositely facing contact surface on the nut.

15. The device according to claim 14, wherein the main body is formed with a co-axial socket and the nut and said one-way clutch are located in said socket portion.

16. The device according to claim 1, wherein the main body is formed with a co-axial socket and the nut and said one-way clutch are located in said socket portion.

* * * * *